United States Patent [19]

Harvey

[11] Patent Number: 4,681,245

[45] Date of Patent: Jul. 21, 1987

[54] METHOD AND APPARATUS FOR DISPENSING OIL WELL PROPPANT ADDITIVE

[76] Inventor: Robert D. Harvey, Rte. 3, Box 177AA, Kilgore, Tex. 75662

[21] Appl. No.: 715,671

[22] Filed: Mar. 25, 1985

[51] Int. Cl.⁴ ............................................. G01F 11/24
[52] U.S. Cl. .................... 222/643; 222/410; 222/412; 222/478
[58] Field of Search ............... 222/412, 413, 188, 185, 222/71, 410, 478, 481.5, 488, 489, 14, 643, 642, 639, 638, 333, 411, 481; 141/309; 250/259, 260; 406/56

[56] References Cited

U.S. PATENT DOCUMENTS

| | | | |
|---|---|---|---|
| 532,645 | 1/1895 | Cushing et al. | 222/413 |
| 2,196,323 | 4/1940 | Norton et al. | 222/188 X |
| 2,458,978 | 1/1949 | Chace | 222/71 X |
| 2,525,973 | 10/1950 | Sundstrom et al. | 222/413 |
| 2,724,535 | 11/1955 | Day et al. | 141/309 X |
| 2,947,359 | 8/1960 | Josendale | 250/260 |
| 2,951,535 | 9/1960 | Mihram | 250/260 |
| 2,988,640 | 6/1961 | Steele | 250/260 |
| 3,010,023 | 11/1961 | Egan | 250/260 |
| 3,139,123 | 6/1964 | Lisciani | 141/309 X |
| 3,160,210 | 12/1964 | Brewer | 137/268 |
| 3,305,133 | 2/1967 | Parker | 222/643 |
| 3,685,212 | 4/1972 | Ullberg | 222/413 X |
| 3,949,220 | 4/1976 | Sparlin | 250/260 |
| 3,999,686 | 12/1976 | Kato | 222/71 X |
| 4,199,680 | 4/1980 | Moon | 250/260 |
| 4,265,266 | 5/1981 | Kierbow | 137/101.19 |
| 4,502,820 | 3/1985 | Fujii et al. | 222/413 X |

FOREIGN PATENT DOCUMENTS 91677 9/1961 Denmark ............................ 222/478

Primary Examiner—Joseph J. Rolla
Assistant Examiner—Nils Pedersen
Attorney, Agent, or Firm—Jerry W. Mills; Roger N. Chauza

[57] ABSTRACT

An apparatus for dispensing an additive (70) into a stream (14) of well proppant includes a sealed housing (42), (44), (52) containing a first chamber (102), a second chamber (104), and an additive dispenser (64), (72) operably connected to a motor (92). The upper chamber (102) is adapted to contain the additive (70), and the lower chamber (104) communicated with the pressurized well proppant stream (14). The additive dispensing means (64), (72) is disposed between the upper chamber (102) and the lower chamber (104). A pressure equalizing tube (98) within said housing (42), (44), (52) extends from the upper chamber (102) through the additive dispenser (64), (72) to the lower chamber (104) to equalize the fluid pressure existing in the lower chamber (104) with the fluid pressure existing in the upper chamber (102) during the dispensing of the additive (70) from the upper chamber (102) to the lower chamber (104). In the preferred embodiment the additive dispenser (64), (72) consists of a screw or auger (72) disposed within an auger ring (64), and the additive (70) flows through the additive dispenser (64), (72) to the lower chamber (104) under the force of gravity. Where the additive (70) consists of radioactive sand used as a tracer for well logging purposes, the apparatus may be provided with an electrical power end control circuit (106) to remotely control the dispensing of radioactive sand (70).

8 Claims, 4 Drawing Figures

METHOD AND APPARATUS FOR DISPENSING OIL WELL PROPPANT ADDITIVE

TECHNICAL FIELD OF THE INVENTION

This invention relates in general to the field of fracturing earth formations in oil or gas wells, and relates more particularly to a method and apparatus for injecting an additive into a proppant for well logging purposes.

BACKGROUND OF THE INVENTION

It is known in the art to inject sand containing a radioactive carrier into fractured earth formations in oil or gas wells to determine the location of such fractures. As an example, reference is made to Mihram, et. al., U.S. Pat. No. 2,951,535. Conventionally, a sand/fluid mixture is injected into a fractured oil well after it has been pressurized by, e.g., a slurry pump. Feeding the slurry pump is a line from a blender, which blends a fluid with sand, commonly termed a proppant. Radioactive sand is conventionally injected by an injection tool in the line between the blender and the slurry pump. The passage of the proppant as mixed with the radioactive additive through the slurry pump causes possible radioactive contamination of the slurry pump and all down-line apparatus, and is thus undesirable. However, conventionally, the injection tool has not been able to be placed on the pressurized side of the slurry pump, as the presence of pressure on the radioactive proppant injecting mechanism causes the sand to clog, especially when there is a change of pressure in the pressurized proppant line. Thus, the location of the injection tool has heretofore been restricted to a low pressure point on the sand proppant slurry line before the pump.

Pressure equalizing conduits are known in the fields of applying dry chemicals to oil wells and more generally for adding a dry material to a liquid. Examples of such tubes can be found in Kierbow, et al., U.S. Pat. Nos. 4,265,266 and Brewer, 3,160,210.

However, these prior art pressure equalizing tubes are not designed for use in high-pressure applications, as evidenced by the disposition of the equalizing tube in each case in a position exterior to the dry material injector housing. Rather than equalizing two chambers at relatively high pressures, Kierbow discloses the venting of pressure on the forward side of a horizontal screw conveyor to ambient atmospheric pressure. Brewer discloses a tube exteriorally connecting a region of a cylinder behind a piston pressing a dry chemical agent downward into a horizontal screw conveyor to a point situated midway along the screw conveyor. In addition to being of relatively complex construction, this positioning of a pressure equalization tube would still not prevent clogging in the remaining distance of the screw conveyor. Both Kierbow and Brewer also disclose pressure equalization tubes as used in connection with horizontal screw conveyors, rather than a pressure equalization tube used in connection with a dispenser operating using the force of gravity to move the additive. A need has thus arisen for a radioactive proppant dispenser which may be connected to the high pressure side of a fracturing system in order to accurately and automatically meter desired amounts of radioactive proppant without clogging.

SUMMARY OF THE INVENTION

The present invention makes positioning of a radioactive proppant dispensing tool on the pressurized side of the slurry pump possible by solving the problem of sand clogging the tool's sand dispensing mechanism. According to the invention, an apparatus for adding an additive to a stream of pressurized proppant comprises a sealed housing containing a first chamber and a second chamber. An additive dispenser, such as an auger or screw, is connected to a drive mechanism such as a motor and turns within a bore of a plate situated between the first and second chambers. The first chamber contains a supply of radioactive sand additive, and the second chamber communicates with the pressurized proppant stream. Disposed within the sealed housing and extending from the first chamber to the second chamber is a pressure equalizing conduit which equalizes the pressure of the first chamber with the pressure of the second chamber and therefore the proppant stream. The equalization of pressure between the two chambers causes the radioactive or other additive to be dispensed smoothly through the additive dispenser.

By disposing a straight pressure equalization tube entirely within the housing between the first chamber and the second chamber, the present invention prevents complications in construction of the device and makes such a tube more suitable for trouble-free high pressure applications.

BRIEF DESCRIPTION OF THE DRAWINGS

For a more complete understanding of the present invention and the advantages thereof, reference is now made to the following detailed description taken in conjunction with the accompanying Drawings in which.

DETAILED DESCRIPTION OF THE INVENTION

Figure 1:
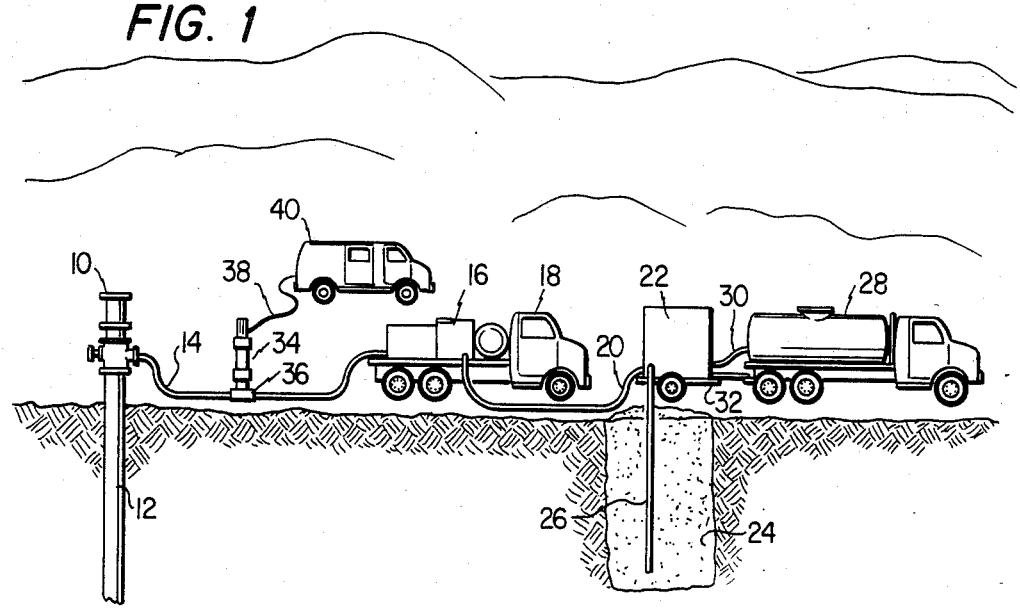
FIG. 1 is a schematic diagram showing employment of the invention in pumping a sand/fluid pressurized stream into a fractured oil well.

Referring now to FIG. 1, a conventional christmas tree 10 is shown associated with a well 12 containing one or more zones (not shown) being subjected to a fracturing process. The location of the fractured zones is to be found by radioactive logging techniques. Being pumped into well 12 via pressurized proppant line 14 is a stream of fluid/sand proppant containing a radioactive marker. The radioactive marker will subsequently be detected to determine the location of the fracturing sand to indicate the success of the fracturing process. Pressurized proppant line 14 is in turn connected to the pressurized side of a pump 16, such as an air-actuated slurry pump, which can be conveniently mounted on a truck 18. The low pressure side of pump 16 is fed by a low pressure proppant/slurry line 20, which in turn comes from a sand/fluid blending unit 22. Sand blending unit 22 blends sand from a sand pit 24 or other sand holding means, as taken up through sand conveying conduit 26, with a transport fluid from a fluid truck 28 which is piped through line 30. The transport fluid, which can be water, may also be stored in a stationary fluid tank. Sand blending unit 22 may be conveniently mounted on a trailer 32.

Interposed on pressurized proppant line 14 in a position well away from pump truck 18 is the radioactive proppant dispensing unit 34 of the invention, which may be attached to the pressurized line 14 by a "T" connection 36. In this embodiment, dispensing unit 34 is actuated and controlled by an electrical system, which communicates through a cable 38 to an electrical truck 40.

Figure 2:
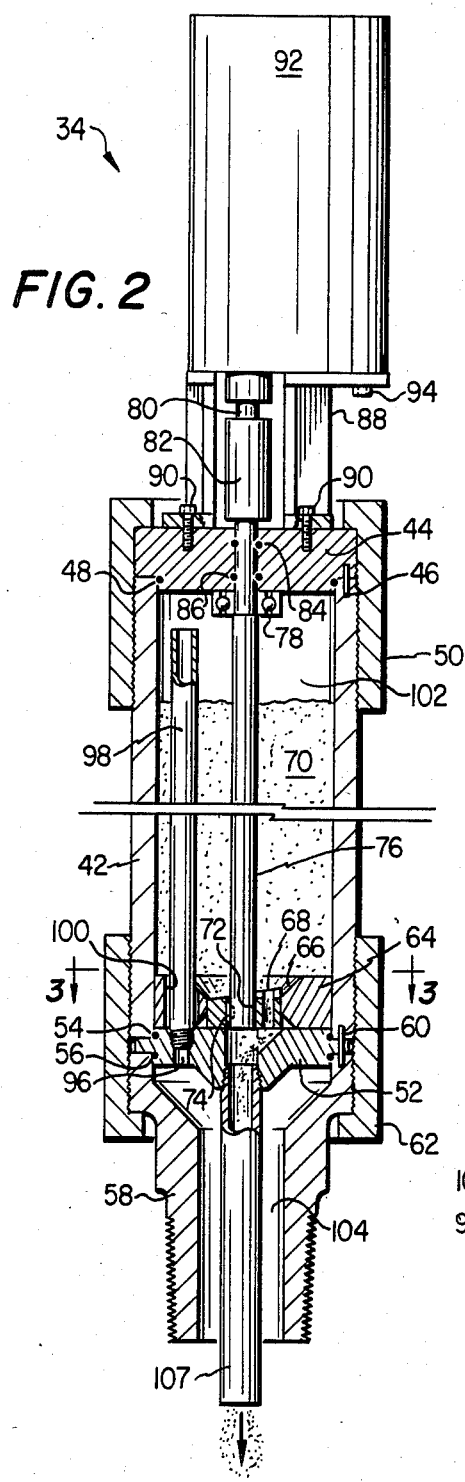
FIG. 2 is a part-elevational, part-sectional view of the proppant dispenser of the invention.
Figure 3:
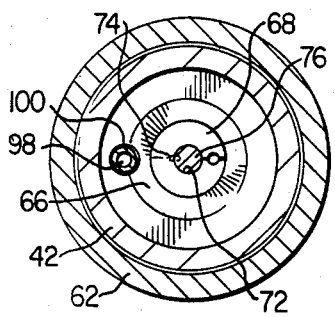
FIG. 3 is a section taken substantially along line 3—3 of FIG. 2.

Dispensing unit 34 is shown in more detail in FIGS. 2 and 3. A central housing 42 is closed off at its upper end by a cap 44 which is positioned with the aid of a bearing needle and assoicated sockets 45. An O-ring and backup ring combination 48 sealably engages cap 44 and central housing 42. Cap 44 is tightened into place by an upper hammer nut 50. The lower end of central housing 42 is abutted by an alignment plate 52, which is sealed by means of O-ring and backup ring combinations 54 and 56. Central housing 42 and alignment plate 52 are fitted onto a fitting connector 58 with the help of a bearing needle and associated sockets 60. Central housing 42, alignment plate 52 and fitting connector 58 are secured together by a lower hammer nut 62.

Positioned on top of alignment plate 52 is a stationary auger ring 64. Auger ring 64 has a central conical upper annulus 66 which extends from a central bore 68 upwardly and outwardly to form a conical feeding section for radioactive sand or other additive 70. Rotating in central bore 68 is an auger or screw 72 which is connected as by means of a woodruff key 74 to a drive shaft 76. Drive shaft 76 is supported at its upper end by a bearing 78 and is connected to a gear motor shaft 80 by a shaft connector 82. O-rings 84 and 86 sealably engage drive shaft 76 and upper cap 44. A motor mount 88 is mounted on cap 44 by means such as cap screws 90, and said motor mount supports a gear motor 92 or other suitable drive means as by screws 94.

Threaded into a bore 96 of alignment plate 52 is an equalizer tube 98, which extends through a passage 100 in stationary auger ring 64 into the upper portion of an upper chamber 102 that is defined by central housing 42, upper cap 44 and stationary auger ring 64. Thus, a passageway is defined from upper chamber 102 to a lower chamber 104, which is formed by fitting connector 58 and alignment plate 52. A delivery pipe 107 is connected from alignment plate 52 in order to deliver the metered sand. As can be seen, equalizer tube 98 is disposed entirely within housing 42, cap 44 and alignment plate 52, and its sole means of support is by means of alignment plate 52 and stationary auger ring 64. Equalizer tube 98 therefore does not require airtight weld mounts to the exterior of fitting connector 58 and housing 42, and can be an entirely straight, simple-to-fabricate section as shown. In this preferred construction, there is no possibility of leakage due to a failure of a sealing attachment of an exterior equalizer tube to one of the chambers with which it communicates.

In an alternate embodiment (not shown) shaft 76 is slotted to catch quantities of sand 70 and is geared to move up and down through an (e.g.) 3½ inch stroke rather then to rotate. Auger ring 64 and auger 72 are replaced with a flat annular ring provided with a pair of O-rings that sealably engage shaft 76. Delivery tube 107 is removed. Shaft 76 moves up and down to catch sand 70 in upper chamber 102 and inject it into lower chamber 104.

In operation, upper hammer nut 50, cap 44 and shaft connector 82 are removed, and upper chamber 102 is filled most of the way with radioactive sand or the like, which is doped by Iridium 192, Iodine 131 or other suitable tracer material. On a fractionation job requiring two million pounds of proppant, approximately ten pounds of sand containing two hundred millicuries of radiation may be required. The size of upper chamber 102 and its defining components can be varied according to the size of the fractionation job.

After the radioactive sand 70 is loaded into upper chamber 102, cap 44 and upper hammer nut 50 are replaced, and motor shaft 80 is reattached to shaft 76 via shaft connector 82. Dispensing unit 34, as reassembled, is then screwed into place on "T" connector 36 in preparation for the pumping of the proppant (FIG. 1). As proppant is pumped under pressure along line 14, radioactive sand 70 is metered from upper chamber 102 into delivery pipe 107 and drops into pressurized proppant line 14 by gravity. In the illustrated embodiment, one complete turn of auger 72 dispenses one-half ounce of radioactive sand into delivery pipe 107. Consequently, the sand may be very accurately metered by control of the rotation of motor 92.

As radioactive sand is being dispensed down delivery pipe 107 into pressurized proppant line 14, equalizer tube 98 equalizes the pressure between lower chamber 104 and upper chamber 102. The fluid passing up equalizer tube 98 may be either air of fluidized proppant. This however is not deleterious, as proppant mixed from normal sand and liquid is less dense than radioactive sand 70 and thus does not mix. Particles of sand 70 are associated with heavy radioisotopic material and are thus heavier than the untreated sand.

Figure 4:
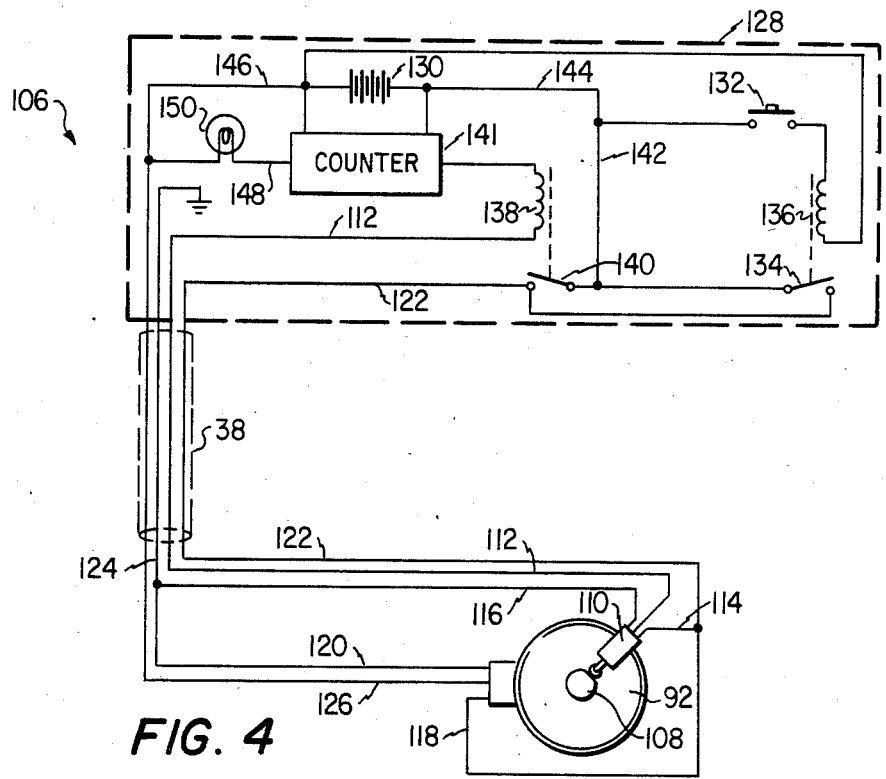
FIG. 4 is an electrical diagram of the electrical power and control circuitry employed in one embodiment of the invention.

Referring to FIG. 4, the revolutions of auger 72 may be controlled remotely by an electrical circuit 106. Motor 92 has mounted on it a central shaft cam 108, which engages a limit switch 110. Limit switch 110 is spring loaded to its open position, but is normally forced closed by cam 108 except when it engages a flat spot 135 of cam 108. Switch 110 is fed by a positive line 112, a negative line 114 and a ground line 116. Negative line 114 and ground line 116 are connected to corresponding negative and ground lines 118 and 120, respectively, feeding motor 92 to form dispensing unit negative and ground lines 122 and 124, respectively. Lines 122 and 124, together with positive limit switch line 112 and a positive motor line 126 together communicate with an operator control station 128 at truck 40 by means of cable 38. Positive motor line 126 is connected directly to a voltage source 130, which may be a 24 volt DC battery source.

Operator control station 128 in this embodiment is designed to dispense proppant additive in increments each defined by one revolution of motor 92. To begin dispensing proppant additive 70, the operator closes a momentary switch 132, which operates to close a switch 134 via a relay 136. This completes the circuit to motor 92, which begins rotating. After limit switch 110 clears the flat spot 135 on cam 108, limit switch 110 closes, causing current to flow through a relay 138, which in turn closes a switch 140. If the operator releases momentary switch 132, which may be in the form of a push button, power will continue to be supplied to motor 92 until limit switch 110 once again encounters flat spot 135, whereupon the power supply to motor 92 will be broken. Thus, the operator is assured of delivering a measured increment of proppant additive to pressurized proppant line 14 each time he closes momentary switch 132.

A counter 141 senses the number of times motor 92 has revolved by counting each time the circuit formed by lines 114, 122, 144, 146, 148 and 112 is energized. An indicator light 150 may be provided to inform the operator when the automatic portion of the control circuit is energized. Thus, electrical circuit 106 allows an operator to dispense measured amounts of proppant additive 70 into pressurized proppant line 14 from a remote station.

While the invention has been described in terms of injecting a radioactive sand additive into a pressurized proppant line during an oil well logging procedure, other uses for the apparatus herein described may be easily determined. The apparatus is useful for injecting any dry or semi-fluid material into a pressurized line. Its use of the force of gravity to dispense the additive and its interiorly disposed pressure equaization tube represent advances in dispenser design in this type of application.

Although an illustrated embodiment of the invention has been described in detail, it should be understood that various changes, substitutions and alterations can be made therein without departing from the spirit and scope of the invention, as defined by the appended claims.

What is claimed is:

1. Sealed apparatus for accurately dispensing an additive into a pressurized stream of well proppant, the apparatus comprising:
    a sealed housing connected to the stream, and including a chamber for containing the additive in a position between said chamber and the pressurized stream;
    a stationary auger ring sealed to the interior of said chamber;
    movable additive dispensing means disposed internal to said apparatus between said chamber and the pressurized stream, and movable within said auger ring from a first position in which the flow of additive is shut off and the chamber is sealed from the pressurized stream, to a second position in which said chamber is in communication with said pressurized stream so that the additive in said chamber can be dispensed into the stream, said dispensing means forming the bottom of said container upon which the additive rests;
    drive means for moving said dispensing means;
    a pressure equalizing conduit disposed within said sealed housing extending from said additive chamber through said auger ring and in communication with the stream of well proppant, said pressure equalizing conduit equalizing the fluid pressure existing in the pressurized stream with the fluid pressure existing in said chamber.

2. The apparatus of Claim 1, wherein said additive dispensing means comprises screw means turning within a bore formed by said stationary plate extending to the walls of said housing, said pressure equalizing conduit extending through said plate from said chamber to said stream.

3. The apparatus of claim 2, wherein said conduit comprises a straight tube supported by said plate and extending to a region of said chamber remote from said plate.

4. The apparatus of Claim 2, wherein said dispensing means includes means for timing the movement of said dispensing means from said first position to said second position to enable dispensing additive quantities as small as a fraction of an ounce, said additive being comprised of particulate matter feeding from said chamber through said dispensing means to the stream of well proppant under the force of gravity.

5. Upright sealed apparatus for delivering proppant containing an additive to a well wherein the proppant is blended with a transport fluid and pressurized for delivery to the well, said apparatus for adding an additive to the pressurized proppant, comprising:
    a sealed housing;
    a stationary apertured divider plate fixed in said housing for defining a first and second chambers within said housing, said first chamber being disposed above said second chamber, and said first chamber being adapted for containing said additive, said second chamber being connected with the pressurized transport fluid and proppant;
    apertured additive dispensing means being rotatable with respect to said stationary plate to a first position and engageable with said plate so that the aperture in said divider plate is sealed by said dispensing means and said first chamber is sealed from said second chamber, thereby preventing dispensing of the additive from said first chamber, said dispensing means being operably rotatable to a second position to align the dispensing means aperture with said plate aperture to thereby meter the additive from said first chamber directly to the pressurized transport fluid;
    a conduit for equalizing the fluid pressure within said second chamber with the fluid pressure with said first chamber, said conduit being disposed within said housing and extending from said first chamber through said stationary plate to said second chamber, wherein after being metered by said dispensing means the additive falls by gravity from said first chamber for mixing with the pressurized transport fluid and proppant and is thereby transported under pressure to said well.

6. The apparatus of claim 5, wherein said conduit comprises a straight tube supported by said plate and extending to a region of said first chamber remote from said plate.

7. An apparatus for adding a nonmagnetic particulate additive to a pressurized stream of oil well proppant, comprising:
    a sealed housing containing a first chamber, a second chamber below said first chamber, an annular alignment plate disposed between said first and second chambers and extending to the walls within said housing, said plate having an opening for the passage therethrough of dispensed additive;
    said first chamber being adapted to contain said additive, said second chamber sealably communicating with and having an interior fluid pressure substantially the same as the pressurized proppant stream;
    an annular stationary auger ring engaging with said annular alignment plate, said auger ring having a central bore in communication with said plate opening and a bevel directed inwardly toward the central bore to direct additive contained within said first chamber toward said plate opening;
    an auger engaging said alignment plate and said auger ring, and having an opening so that when said auger is rotated the opening therein is aligned with the plate opening and with the central bore in said auger ring so that a small dispensing path is provided from said first chamber to said second chamber, said auger being disposed to rotate within said central bore in said auger ring;

a central shaft coaxially secured to said auger and extending upward sealably and rotatably through the top of said first chamber to be driven exteriorly to said housing;

a delivery tube fixed to said annular plate and axially aligned with said plate opening to receive therefrom dispensed additive, said tube extending proximate the pressurized stream;

a pressure equalizing conduit within said housing and extending from said first chamber through an offset opening in said auger ring and set into an aligned offset opening in said annular plate, and aligned offset opening communicating with said second chamber, said conduit comprising a tube supported by said annular plate and extending to near the top of said first chamber, said conduit equalizing the fluid pressure within said second chamber with the fluid pressure within said first chamber to prevent clogging of said auger.

8. A sealed additive dispenser for use in dispensing small amounts of additive into a pressurized line, comprising:

an upright cannister defining a container for holding the additive;

a top cap arrangement removably fixed to a top end of said cannister to withstand a pressurization of said container, said top cap having a bearing bore;

a shaft extending through said bearing bore, one end of said shaft being located at a bottom of said container;

gasket means for sealing said top cap arrangement to said cannister and for sealing said shaft in said bearing bore to said top cap arrangement, said gasket means being effective to maintain the inside of said container pressurized;

an alignment plate removably fixed to the bottom of said cannister, said alignment plate having a central bore in axial alignment with said shaft, and an offset bore displaced laterally from said central bore;

a fitting connector removably attachable to the bottom of said cannister and including a passageway in communication with said offset bore, a bottom end of said fitting connector including means for fastening to said pressurized line;

means for sealing said alignment plate and said fitting connector to the bottom of said cannister for maintaining a pressure within said container;

additive dispensing means disposed at the bottom of said container and cooperating with a movement of said shaft from a first position to form an opening and dispense additive by gravity into said alignment plate central bore, and cooperating with a movement of said shaft to a second position to close said opening and thereby stop said dispensing;

an elongate pressure equalizing conduit fixed to said alignment plate in said offset bore to form a conduit from the fitting connector passageway to a position near the top of said container;

an elongage delivery tube fixed to said alignment plate for providing a path for dispensed additive from the alignment plate central bore through said fitting connector passageway to the pressurized line; and a bottom cap arrangement removably fixed to the bottom end of said cannister, said bottom cap being effective to fix said alignment plate and said fitting connector in a sealed engagement with the bottom of said container.

* * * * *